United States Patent [19]

Ohriner et al.

[11] Patent Number: 4,803,045
[45] Date of Patent: Feb. 7, 1989

[54] COBALT-FREE, IRON-BASE HARDFACING ALLOYS

[75] Inventors: Evan K. Ohriner, Hamden, Conn.; Edward P. Whelan; Tsuguyasu Wada, both of Ann Arbor, Mich.; Howard Ocken, Palo Alto, Calif.

[73] Assignee: Electric Power Research Institute, Inc., Palo Alto, Calif.

[21] Appl. No.: 922,528

[22] Filed: Oct. 24, 1986

[51] Int. Cl.⁴ .................. C22C 38/44; C22C 38/34; C22C 38/38
[52] U.S. Cl. .................................... 420/57; 420/46; 420/47; 420/59; 148/327
[58] Field of Search .................. 148/325, 327, 326; 420/56–59, 47, 66, 46, 51, 584

[56] References Cited

U.S. PATENT DOCUMENTS 3,165,400  1/1965  Roy et al. ........................ 420/47
3,366,472  1/1968  Tanczyn et al. ................. 148/327

FOREIGN PATENT DOCUMENTS 904141  8/1962  United Kingdom ............. 420/59

Primary Examiner—Deborah Yee
Attorney, Agent, or Firm—Flehr, Hohbach, Test, Albritton & Herbert

[57] ABSTRACT

Novel wear-resistant, anti-galling, cobalt-free hardfacing iron based alloys are provided which are useful for construction of plant or manufacturing facility components exposed to aggressive environments. The alloys are particularly useful to construct components used in the cooling systems of nuclear power plants.

16 Claims, 1 Drawing Sheet

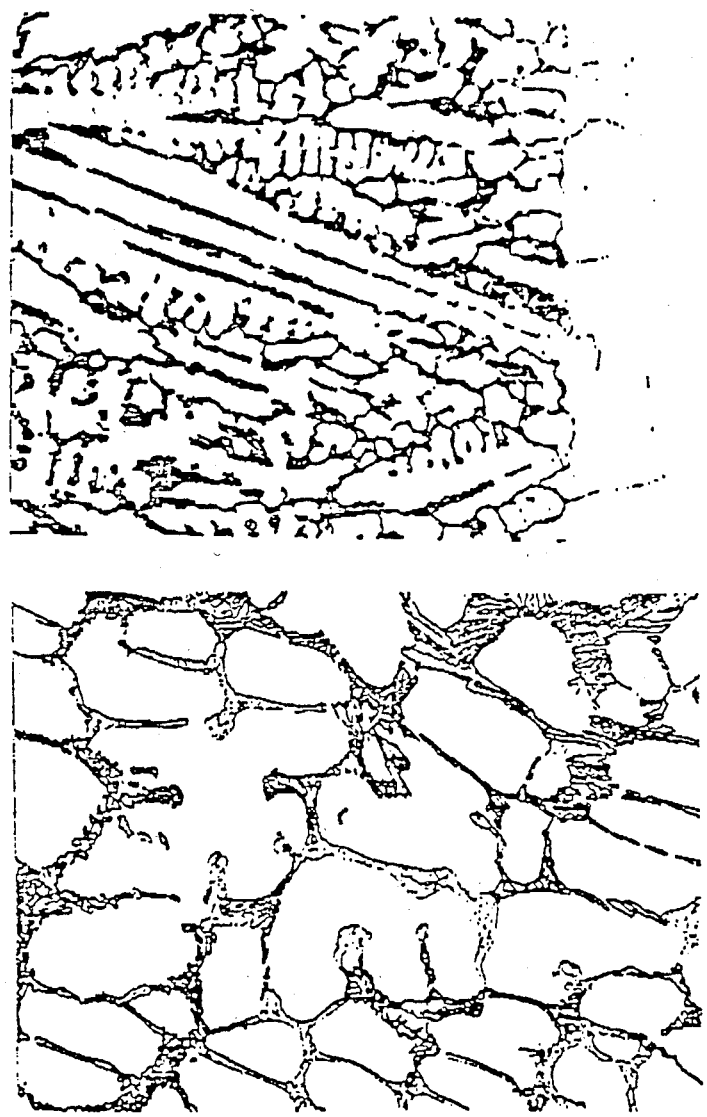

COBALT-FREE, IRON-BASE HARDFACING ALLOYS

The present invention relates to novel cobalt-free, iron-base hardfacing alloys that are wear-resistant, especially when that attribute defined as galling wear-resistance is evaluated. The novel hardfacing alloys are particularly useful in applications where: (1) outstanding resistance to galling is required; (2) transmutation of cobalt into radioactive $^{60}$Co is a concern; and (3) non-magnetic alloys must be used.

BACKGROUND OF THE INVENTION

Hardfacing alloys are used to impart wear-resistance to less expensive alloys in a variety of industries and applications. Cobalt is a key constituent of the best performing of the hardfacing alloys that are most extensively used. Because of the high cost of cobalt and because its market price fluctuates significantly, there is a need to develop hardfacing alloys with reduced levels of cobalt. A special need exists to reduce the cobalt content of the hardfacing alloys used in the primary system of nuclear power plants. The small amount of wear and corrosion the cobalt-base alloys experience ultimately results in the formation of the gamma-emitting isotope $^{60}$Co. This isotope is incorporated into the oxides that form on out-of-core component that must be inspected, repaired or replaced by maintenance personnel. The activated $^{60}$Co is responsible for most of the radiation exposure these workers receive.

However, a cobalt-free or low-cobalt hardfacing alloy must, in addition to being wear-resistant, also show adequate levels of hardness, weldability and corrosion resistance. It would therefore be desirable to utilize cobalt-free hardfacing alloys which have adequate or improved wear resistance, galling resistance, hardness and mechanical properties in diverse applications.

It is thus an object of the present invention to provide novel wear-resistant, anti-galling, cobalt-free hardfacing alloys.

It is yet another object of the present invention to provide methods for constructing components exposed to wear and corrosive (aggressive) environments, whereby the components are hardfaced with wear-resistant, anti-galling, cobalt-free alloys.

These and other objects of the invention will be made apparent from the following description of the preferred embodiments and appended claims.

BRIEF DECRIPTION OF THE DRAWINGS

FIG. 1A is a photomicrograph ($\times$500) of a cast bar made of an alloy according to the present invention.

FIG. 1B is a photomicrograph ($\times$500) of an overlay weld according to the present invention made on an austenitic steel plate.

SUMMARY OF THE INVENTION

The present invention provides novel cobalt-free alloys for use as construction elements to be exposed to aggressive environments. These alloys are characterized by high wear resistance and anti-galling properties, and consist essentially by weight of 0.85 to 1.4% carbon; 5.0 to 13.0% manganese; 1.5 to 5.5% silicon; 18.0 to 27.0% chromium; 4.0 to 12.0% nickel; up to 6.0% molybdenum; 0.1 to 0.3% nitrogen; 0 to 1.0% vanadium; 0 to 1.0% niobium; 0 to 1.0% titanium; 0 to 1.0% tantalum; and the balance iron. The alloys are characterized as having a microstructure of austenitic matrices and eutectic alloy carbides.

DESCRIPTION OF THE PREFERRED EMBODIMENTS

The present invention provides novel alloys which have excellent wear resistance and particularly good anti-galling properties. Galling wear is the phenomenon which occurs when two metallic surfaces slide upon each other under a load, whereby partial adhesion takes place on the contacting surfaces, roughens them, and results in a transfer of material. The transfer of material constitutes galling wear, usually measured in terms of a change in depth of the surface roughness. The extent of galling wear is a function of not only the characteristics of the surfaces in contact with each other, but also of the characteristics of the respective subsurfaces since the surfaces are under a load.

Conventional cobalt-based hardfacing alloys, such as Stellite No. 6, consist of two phases: carbides and a cobalt-based matrix. Because the cobalt-based matrix can dissolve a relatively high content of carbon while in solid solution (sometimes referred to as interstitial solid solution hardening) the hardness and resistance to deformation of the matrix is relatively high. The cobalt-based matrix typically is coupled with an appropriate eutectic carbide.

The present invention, however, is developed to provide the hard wear-resistant and galling-resistant surfaces of a cobalt-based hardfacing alloy, without the use of cobalt, due to the disadvantages of cobalt in certain applications described above. The present invention provides cobalt-free alloys having a microstructure consisting of an austenitic (iron-based) matrix and eutectic alloy carbides which provide the wear and galling resistance required for hardfacing alloys.

In general the cobalt-free alloys according to the present invention have the following composition:
0.85–1.4% by weight carbon
5.0–13.0% manganese
1.5–5.5% silicon
18.0–27.0% chromium
4.0–12.0% nickel
Up to 6.0% molybdenum
0.1–0.3% nitrogen
0–1.0% vanadium
0–1.0% niobium
0–1.0% titanium
0–1.0% tantalum
Balance iron Iron dissolves more carbon and nitrogen than nickel in austenitic structures. Therefore, the alloys of the present invention are iron-based. However, since pure iron is ferritic in structure at room temperature, austenite formers such as nickel and manganese are added to stabilize the austenitic structure. However, since the presence of manganese also increases carbon solubility, it is desired to be the major austenitic stabilzer and thus is used in the amount of 5–13% by weight, preferably 5–12% by weight with the most preferred amount being about 8%. Amounts of manganese lower than 5% are not required, since then the rest of the austenite former must comprise nickel, too much of which may adversely affect the galling resistance. But manganese in amounts higher than about 13% will begin to decrease the toughness and weldability of the alloy, so nickel is used in an amount of 4–12% by weight, preferably 4–9% by weight, and most preferably about 5% by weight.

EXAMPLES OF SPECIFIC ALLOY COMPOSITIONS
ACCORDING TO THE PRESENT INVENTION INCLUDE:

| Heat | Form | Composition (weight %) | | | | | | | | Fe |
| --- | --- | --- | --- | --- | --- | --- | --- | --- | --- | --- |
| | | C | Mn | Si | Ni | Cr | Mo | N | Other | |
| B1 | cast | 1.03 | 7.97 | 3.11 | 4.02 | 24.71 | 1.99 | 0.26 | | Balance |
| 6995 | PTA | 1.33 | 9.16 | 3.18 | 4.00 | 24.74 | 2.15 | 0.22 | | Balance |
| B2 | cast | 1.04 | 11.91 | 3.13 | 2.99 | 24.62 | 1.99 | 0.01 | | Balance |
| 6994 | PTA | 1.33 | 12.60 | 3.13 | 3.27 | 24.67 | 2.15 | 0.22 | | Balance |
| 6961A | GTA | 1.14 | 7.75 | 2.97 | 5.85 | 19.09 | 1.94 | 0.19 | | Balance |
| 6998 | PTA | 1.34 | 9.37 | 3.23 | 5.97 | 20.86 | 2.10 | 0.22 | | Balance |
| 6983A | GTA | 1.11 | 8.46 | 3.11 | 4.06 | 14.97 | 1.64 | 0.23 | | Balance |
| 6999 | PTA | 1.34 | 9.56 | 3.38 | 3.94 | 19.06 | 1.60 | 0.23 | | Balance |
| 6961B | GTA | 1.10 | 7.40 | 2.82 | 8.36 | 21.28 | 1.86 | 0.18 | | Balance |
| 7026B[c] | cast | 1.1 | 8.0 | 3.0 | 5.5 | 24. | 1.5 | 0.2 | 0.5 vanadium | Balance |
| 7030[c] | cast | 1.1 | 8.0 | 3.0 | 5.5 | 24. | 1.5 | 0.2 | 0.5 niobium | Balance |

[c]All entries are nominal compositions.

Silicon is used in an amount of 1.5–5.5% by weight to increase the solid solution strengthening of the iron matrix and to also increase the fluidity of the molten alloy during processing. But, since silicon tends to partition in the molten phase during solidification of the alloy, thereby segregating to the portion of the molten alloy which solidifies last, high silicon content may give high hardness, but poor toughness. Therefore, silicon below about 5.5% by weight is utilized, preferably in the range of 1.5–5.0%, and most preferably about 3% by weight.

Molybdenum also provides solid solution strengthening and, in particular, provides interaction solid-solution strengthening with carbon. Therefore, some molybdenum should always be present, however, too high molybdenum content may stabilize undesired alloy carbides such as $M_6C$, and tend to reduce the carbon content of the solid solution. Therefore molybdenum up to about 6% by weight is utilized, preferably up to about 3% by weight, and most preferably at about 2% by weight.

Nitrogen increases the solid solution strengthening, and particularly increases strain hardening. However, too high a nitrogen content may cause problems in welding, therefore it is preferred that nitrogen be utilized in the range of 0.1–0.3% by weight, preferably at about 0.2% by weight.

Chromium is utilized to provide primarily corrosion resistance and is utilized in a range of about 18–27%.

To provide the desired matrix and carbides, carbon is utilized in the amounts of 0.85–1.4% by weight. In certain instances, microalloying elements such as vanadium, niobium, tantalum and titanium may be added to improve the morphology of the primary carbides, thereby improving the mechanical properties. However, excessive amounts of these strong carbide formers may decrease the carbon content of the solid solution, therefore the addition is limited to no more than 1% for each of these elements.

While it is desired and preferred that the balance of the alloy, other than those specifically recited elements above, be iron, it will be realized of course that during the processing trace amounts of unavoidable impurities will be present. It is contemplated, however, that these small amounts of unavoidable impurities will not substantially change or impair the desirable properties of the alloys of the invention.

The alloys according to the invention may be formed in the cast condition, since the microstructure is provided by the selected alloy composition. Although the size of the solidification cell depends on the cooling rate from the liquid state, essential constituents are not substantially different between cast and welded alloys. There are usually at least two types of carbides observed in the typical composition according to the present invention.

The alloys according to the present invention are weldable, particularly by the conventional gas-tungsten-arc method (GTA) and plasma-transfer-arc method (PTA), accompanied by preheating to about 200° C. For alloys with carbon content toward the higher end of the desired range, preheating to about 425° C. is preferred to provide crack-free overlay welds. Other processes such as oxyacetylene or shielded metal arc processes may also be employed for welding.

Alloys according to the present invention may be used as hardfacing elements in a plant or manufacturing facility where the element is to be exposed to an abrasive and corrosive (aggressive) environment. The alloys can be used, for example, by placing welded overlays on alloy steel baseplate.

Referring to FIG. 1A there is shown a photomicrograph at 500× magnification of a cast 16 millimeter diameter bar having a composition of 1.11% carbon, 8.46% manganese, 3.11% silicon, 4.06% nickel, 14.9% chromium, 1.64% molybdenum, and 0.23% nitrogen. The photomicrograph was taken by etching the alloy in 50% nitric acid electrolytically plus Murakami solution. As can be seen by FIG. 1A an austenitic matrix is shown with some eutectic alloy carbide portions.

Referring to FIG. 1B there is shown a photomicrograph at 500× magnification of a plasma-transfer-arc overlay weld on a type 304SS austenitic steel plate. The overlay weld consists of 1.34% carbon, 9.37% manganese, 3.23% silicon, 5.97% nickel, 20.86% chromium, 2.10% molybdenum, and 0.2% nitrogen. As can be seen, the structure is qualitatively not substantially different from that shown in FIG. 1A., i.e., an austenitic matrix containing several eutectic carbide portions.

The cobalt-free hardfacing alloys according to the present invention have excellent wear-resistance, and particularly good galling-wear-resistance.

For purposes of illustration, the following examples are shown to illustrate and better understand the invention. However, it is not intended that the invention be limited thereby.

The galling test used to obtain the data reported in the examples that follow consists of loading the flat surface of a 9.5 mm (0.375 in) diameter pin specimen against a flat specimen using a modified Brinell hardness tester. Both pin and block are made from the same alloy.

Loads are applied at 9,800, 19,600 and 29,400 N (2,200, 4,400 or 6,600 lb), which corresponds to a normal applied stress of 140, 275 or 415 MPa (20, 40 or 60 ksi). The pin specimen is then rotated manually ten times in alternate directions. The wear test specimen surfaces are prepared with a surface ground finish of 0.2 to 0.4 microns (18 to 16 micro-inches) arithmetic average as measured normal to the grinding direction. A degree of damage associate with each galling test was determined by surface profilometry. The surface profile was obtained for each wear scar on the galling test block in directions both parallel and perpendicular to the original grinding marks. The surface profiles were generated using a skid-referenced Bendix Microcorder with a radius stylus. The differences between the height of the highest peak and the lowest valley on each of four radial traces were calculated and averaged. The difference in heights for traverses of equivalent length, in directions parallel and perpendicular to the grinding direction on an untested surface of the same block were similarly calculated and averaged. The degree of damage for each galling test was then obtained by subtracting the average difference of the pre-test ground surface from that of galling wear test surface. Galling tests were conducted in duplicate, unless otherwise noted, at each of the three test loads.

EXAMPLE 1

Properties of alloys made in accordance with the present invention tested in the cast condition are shown in Table 1. These alloys show satisfactory hardness, tensile strength and galling resistance as compared to a conventional cobalt-containing hardfacing alloy, Stellite No. 6 ®, the last entry in Table 1.

EXAMPLE 2

Table 2 gives 11 examples of alloys according to the present invention of gas-tungsten-arc or plasma-transfer-arc welding hardface, overlayed on 38 millimeter thick plates of AISI 304 austenitic steel. Each GTA weld was made in an area 50×100 mm on a plate 100×150 mm in size. Each PTA weld was made on a full surface of a 280×150 mm plate. Using the preheating schedule shown in the Table, crack-free overlays were obtained. The galling resistance given for the PTA welded overlays are excellent. Data for cobalt-containing hardfacing alloy, Stellite No. 6 ® and Stellite No. 156 ®, are given as the last entries in Table 2.

TABLE 2

PROPERTIES OF WELD OVERLAY HARDFACING ALLOYS

| Alloy ID (Weld Overlays) | Mechanical Properties | | | | | Weldability Test | | Galling Wear Test Surface Damage (micron) | | | | | |
|---|---|---|---|---|---|---|---|---|---|---|---|---|---|
| | Hardness HV 10 | YS ksi | UTS ksi | Elong. % | R.A. % | Charpy Energy ft. lb | Preheat Temp. F. | No. of Layers w/o Cracking | in air | | | in Deionized Water | | |
| | | | | | | | | | 20 ksi | 40 ksi | 60 ksi | 20 ksi | 40 ksi | 60 ksi |
| PTA 6994 | 476 | — | — | — | — | 2.7 | 800 | 2 | 0.6 | 1.0 | 1.5 | 0.9 | 0.4 | 0.4 |
| PTA 6995 | 446 | — | — | — | — | 4.2 | 800 | 2 | 0.5 | 1.0 | 0.7 | 0.1 | 0.1 | 1.0 |
| PTA 6996 | 417 | — | — | — | — | 6.2 | 800 | 2 | 0.5 | 2.0 | 1.9 | 0.0 | 0.8 | 1.5 |
| PTA 6998 | 436 | — | — | — | — | 7.2 | 500 | 2 | 1.2 | 0.7 | 1.0 | 1.0 | 0.7 | 0.8 |
| PTA 6999 | 425 | — | — | — | — | 7.5 | 500 | 2 | 0.3 | 1.1 | 2.4 | 0.6 | 1.0 | 0.8 |
| PTA Stellite 156 | — | — | — | — | — | — | — | — | — | — | 2.9 | — | — | 0.9 |
| GTA 6998 | 389 | — | — | — | — | 6.4 | RT | 5 | 0.4 | 3.5 | 9.9 | 0.8 | 1.9 | 7.4 |
| GTA Stellite 6 | — | — | — | — | — | 17.0* | RT | 5 | 1.8 | 3.3 | 2.3 | 0.0 | 1.3 | 1.4 |

*Data obtained by Cabot Corporation on unnotched specimens.

EXAMPLE 3

The galling wear resistance of some commercial iron and nickel-base hardfacing alloys were tested for comparision purposes using the method described above. The results of these tests are given in Table 3. These alloys exhibit generally less galling-wear resistance than those in Tables 1 and 2.

TABLE 3

Self-Mated Galling Tests of PTA Deposits of Commercially Available Nickel-and Iron-Base Hardfacing Alloys of Deionized Water

| Alloy* | 140 MPa (20 ksi) | 275 MPa (40 ksi) | 415 MPa (60 ksi) |
|---|---|---|---|
| Colmonoy 84 (Ni) | 55 | 55 | 54[b] |
| Haynes 711 (Ni) | 1.6 | 42 | 45 |
| RHDIC (Fe) | NM | NM | 8 |
| Vertx 4776 (Ni) | 1.6 | 44 | NM |

TABLE 1

Test Results on Cast Alloys

| Alloy ID | Mechanical Properties | | | | | | Galling Wear Test Surface Damage (micron) | | | | | |
|---|---|---|---|---|---|---|---|---|---|---|---|---|
| | Hardness HV10 | YS ksi | UTS ksi | Elong. % | R.A. % | Charpy Energy ft. lb | in air | | | in Deionized Water | | |
| | | | | | | | 20 ksi | 40 ksi | 60 ksi | 20 ksi | 40 ksi | 60 ksi |
| B2 | 390 | 76 | 79 | 0.6 | 0.5 | 2.3 | 2.9 | 4.5 | 9.8 | 1.3 | 1.8 | 1.6 |
| B1 | 370 | 76 | 80 | 0.6 | 0.3 | 2.3 | 2.0 | 7.2 | 20.5 | 0.7 | 1.0 | 1.1 |
| 6961A | 348 | — | 73 | — | — | 2.8 | 5.1 | 18.6 | 9.9 | 1.1 | 3.1 | 0.0 |
| 6983A | 360 | — | 67 | — | — | 3.0 | 4.3 | 7.7 | 30.7 | 0.0 | 2.3 | 1.4 |
| 7025B | 350 | 71 | 87 | 1.0 | 0.5 | — | 2.1 | 4.5 | 6.0 | 0.1 | 0.8 | 2.1 |
| 7026B | 342 | 71 | 88 | 1.3 | 0.5 | — | 4.7 | 5.1 | 20.8 | 0.3 | 2.4 | 1.6 |
| 7030 | 366 | 81 | 90 | 0.6 | 0.5 | — | 2.7 | 3.8 | 7.6 | 0.0 | 0.3 | 2.0 |
| Stellite No. 6 | 415 | 86 | 101 | 0.8 | 0.5 | 7.3 | 2.0 | 3.2 | 4.0 | 0.3 | 1.6 | 1.1 |

TABLE 3-continued

Self-Mated Galling Tests of PTA Deposits of
Commercially Available Nickel-and Iron-Base
Hardfacing Alloys of Deionized Water

| Alloy* | 140 MPa (20 ksi) | 275 MPa (40 ksi) | 415 MPa (60 ksi) |
|---|---|---|---|
| Tribaloy T-700 (Ni) | 13 | 24 | 27[b] |

*Primary alloy constituent noted in parenthesis.
[a]Single test unless otherwise noted.
[b]Mean of duplicate tests.
NM Not measured.

It is claimed that:

1. A cobalt-free, wear-resistant and anti-galling hardfacing weld-consumble or cast alloy consisting essentially by weight of 0.85–1.4% carbon; 5.0–13.0% manganese; 1.5–5.5% silicon; 18.0–27.0% chromium; 4.0–12.0% nickel; an effective amount up to 6.0molybdenum to provide solid solution strengthening with carbon molybdenum; 0.1–0.3% nitrogen; 0–1.0% niobium; 0–1.0% titanium; 0–1.0% tantalum; and the balance iron; said alloy having a microstructure consisting essentially an austenitic matrix and eutectic alloy carbides.

2. An alloy according to claim 1 wherein manganese is present in the amount of 5.0–12.0% by weight; silicon is present in the amount of 1.5–5.0%; nickel is present in the amount of 4.0–9.0%; and molybdenum is present in an amount an effective amount up to 3.0% to provide solid solution strengthening with carbon.

3. In a method for constructing a plant comprising elements exposed to an aggressive environment, the improvement comprising the step of forming said elements from a wear-res,istant, anti-galling cobalt-free weldable, cast alloy consisting essentially by weight of 0.85%–1.4% carbon; 5.0–13.0% manganese; 1.5–5.5% silicon; 18.0–27.0% chromium; 4.0–12.0% nickel; an effective amount up to 6.0% molybdenum to provide solid solution strengthening with carbon molybdenum; 0.1–0.3% nitrogen; 0–1.0% vanadium; 0–1.0% niobium; 0–1.0% titanium; 0–1.0% tantalum; and the balance iron; wherein said alloy has a microstructure consisting essentially of austenitic matrix and eutectic alloy carbides.

4. An alloy according to claim 2 consisting essentially by weight of:

| Carbon | 1.03% |
|---|---|
| Manganese | 7.97 |
| Silicon | 3.11 |
| Nickel | 4.02 |
| Chromium | 24.71 |
| Molybdenum | 1.99 |
| Nitrogen | 0.26 |
| Iron | bal. |

5. An alloy according to claim 2 consisting essentially by weight of:

| Carbon | 1.1% |
|---|---|
| Manganese | 8.0 |
| Silicon | 3.0 |
| Nickel | 5.5 |
| Chromium | 24.0 |
| Molybdenum | 1.5 |
| Nitrogen | 0.2 |
| Niobium | 0.5 |
| Iron | bal. |

6. An alloy according to claim 2 consisting essentially by weight of:

| Carbon | 1.33% |
|---|---|
| Manganese | 9.16 |
| Silicon | 3.18 |
| Nickel | 4.00 |
| Chromium | 24.74 |
| Molybdenum | 2.15 |
| Nitrogen | 0.22 |
| Iron | bal. |

7. An alloy according to claim 2 consisting essentially by weight of:

| Carbon | 1.34% |
|---|---|
| Manganese | 9.37 |
| Silicon | 3.23 |
| Nickel | 5.97 |
| Chromium | 20.86 |
| Molybdenum | 2.10 |
| Nitrogen | 0.22 |
| Iron | bal. |

8. An alloy according to claim 2 consisting essentially by weight of:

| Carbon | 1.14% |
|---|---|
| Manganese | 7.75 |
| Silicon | 2.97 |
| Nickel | 5.85 |
| Chromium | 19.09 |
| Molybdenum | 1.94 |
| Nitrogen | 0.19 |
| Iron | bal. |

9. An alloy according to claim 2 consisting essentially by weight of:

| Carbon | 1.10% |
|---|---|
| Manganese | 7.40 |
| Silicon | 2.82 |
| Nickel | 8.36 |
| Chromium | 21.28 |
| Molybdenum | 1.86 |
| Nitrogen | 0.18 |
| Iron | bal. |

10. A cobalt-free, wear-resistant and anti-galling hardfacing weld-consumable or cast alloy having a microstructure consisting essentially of an austenitic matrix and eutectic alloy carbides consisting essentially by weight of:

| Carbon | 1.04% |
|---|---|
| Manganese | 11.91 |
| Silicon | 3.13 |
| Nickel | 2.99 |
| Chromium | 24.62 |
| Molybdenum | 1.99 |
| Nitrogen | 0.1 |
| Iron | bal. |

11. A cobalt-free, wear-rsistant and anti-galling hardfacing weld-consumable or cast alloy having a microstructure consisting essentially of an austenitic matrix and eutectic alloy carbides consisting essentially by weight of:

| | |
|---|---|
| Carbon | 1.33% |
| Manganese | 12.60 |
| Silicon | 3.13 |
| Nickel | 3.27 |
| Chromium | 24.67 |
| Molybdenum | 2.15 |
| Nitrogen | 0.22 |
| Iron | bal. |

12. A cobalt-free, wear-resistant and anti-galling hard facing weld-consumable or cast alloy having a microstructure consisting essentially of an austenitic matrix and eutectic alloy carbides consisting essentially by weight of:

| | |
|---|---|
| Carbon | 1.34% |
| Manganese | 9.56 |
| Silicon | 3.38 |
| Nickel | 3.94 |
| Chromium | 19.06 |
| Molybdenum | 1.06 |
| Nitrogen | 0.23 |
| Iron | bal. |

13. An alloy according to claims 6, 11, 7, or 12 in a plasma-transfer-arc welded form.

14. A cobalt-free, wear-resistant and anti-galling hardfacing weld-consumable or cast alloy having a microstructure consisting essentially of an austenitic matrix and eutectic alloy carbides consisting essentially by weight of:

| | |
|---|---|
| Carbon | 1.11% |
| Manganese | 8.46 |
| Silicon | 3.11 |
| Nickel | 4.06 |
| Chromium | 14.97 |
| Molybdenum | 1.64 |
| Nitrogen | 0.23 |
| Iron | bal. |

15. An alloy according to claims 8, 14 or 9 in a gas-tunghsten-arc welded form.

16. A wear-resistant and antigalling cobalt-free structural element for use in an aggressive environment produced according to the method of claim 3.

* * * * *